United States Patent Office 3,257,249
Patented June 21, 1966

3,257,249
METHOD OF MAKING ACETYLENIC EPOXY AMINO COMPOUNDS
Michael Israel, Convent Station, and Rita M. Dudak, Hibernia, N.J., and George J. Donovan, Dayton, Ohio, assignors to Thiokol Chemical Corporation, Bristol, Pa., a corporation of Delaware
No Drawing. Filed June 6, 1963, Ser. No. 285,898
1 Claim. (Cl. 149—109)

This application is a continuation-in-part of application Serial No. 1,155, filed January 5, 1960, now abandoned.

This invention relates to an improved method of making fuel mixtures comprising acetylenic epoxy amino compounds.

The fuel mixtures, which are useful as high energy liquid fuels particularly suitable for the propulsion of liquid fuel rockets, are described in detail in commonly owned copending application Serial No. 285,899, filed on even date herewith.

In general, the preferred fuels comprise mixtures of dipropargylglycidylamine, propargyldiglycidylamine, and tripropargylamine prepared by reacting a propargyl halide, such as the chloride or bromide, with ammonia in a known fashion to prepare mixtures of mono-, di-, and tripropargylamine. This amine mixture is then reacted with epichlorohydrin, whereby chlorohydrins are formed by the mono- and diamine components of the mixture. Finally, the chlorohydrins are cyclized by treatment with a base, preferably a concentrated aqueous solution (40–50%) of an alkali metal hydroxide or alkaline earth hydroxide such as LiOH, NaOH, KOH, Ca(OH)$_2$, Ba(OH)$_2$, etc.

It has now been found that particularly pure fuel mixtures can be obtained in a particularly convenient fashion by employing an ethereal solution of amines, at about 50% concentration, for reaction with epichlorohydrin to form chlorohydrins. Further, by removing the solvent and then cyclizing the chlorohydrins at or below 10° C., base-catalyzed polymerization reactions are discouraged, resulting in a purer product than was heretofore obtainable. Also to inhibit polymerization reactions, it is desirable to use no more base than a slight excess over the stoichiometric quantity.

After the cyclization reaction, the solution of reactants is slowly diluted with cold water to dissolve precipitated inorganic salts. To inhibit polymerization, the dilution is done slowly so that the temperature does not rise to above about 25° C. The organic and aqueous layers are next separated, the aqueous layer extracted with a volatile solvent such as diethyl ether and the solvent ether and organic layer are combined.

The solvent is conveniently removed by aspiration at room temperature. To prevent polymerization, it is desirable to avoid heating the product, and solvent removal processes are best carried out at reduced pressures.

A better understanding of the invention will be had by referring to the following example, given by way of illustration.

Example 1

A high energy mixed glycidylamine liquid fuel consisting of a mixture of dipropargylglycidylamine, propargyldiglycidylamine, and tripropargylamine was prepared as follows.

Mono-, di-, and tripropargylamine were prepared by reacting propargyl bromide, HC≡C—CH$_2$Br, with an excess of ammonia. (Alternatively, propargyl chloride has been used as a reactant.) In the synthesis, propargyl bromide is gradually added, over a period of 3 hours and with vigorous agitation, to liquid ammonia, keeping the temperature below the boiling point. The reaction mixture is then agitated for an additional 30 minutes. A volume of ether approximately equal to the original volume of liquid ammonia employed is then slowly added to extract the organic phase. The mixture is left to warm to room temperature and the residual ammonia is allowed to evaporate. (If necessary, gentle warming can be used to expel the last traces of ammonia.) Simultaneously, ammonium bromide precipitates. The solid is filtered out, leaving an ethereal solution of mixed mono-, di-, and tripropargylamines which can be separated by distillation, although it is often convenient to proceed without isolation of the individual amines.

By increasing the ratio of liquid ammonia to acetylenic halide, the formation of primary amines is favored. By decreasing the ratio of ammonia to halide, the formation of tertiary amine products is favored. In most cases, a secondary amine is the predominant product in the amine mixtures produced.

An ethereal amine mixture containing monopropargylamine (11.0 gm., 0.2 mole), dipropargylamine (37.2 gm., 0.4 mole), and tripropargylamine (26.2 gm., 0.2 mole) was concentrated by distillation to remove the ether solvent until the solution contained about 50 percent by weight of amines. A solution of this concentration was found optimum for glycidylization since higher concentrations tended to give uncontrollable exothermic reactions unless carefully watched, and less concentrated solutions, when later heated, had too low a reflux temperature to permit reaction in feasibly short time periods.

The 50 percent solution is next mixed with 77.7 gm. (0.84 mole) of epichlorohydrin

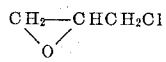

with sufficient epichlorohydrin being used to assure complete reaction of the primary and secondary amines. To promote reaction, the solution was heated in a 500 ml. flask equipped with a stirrer and reflux column for about four hours at its reflux temperature—about 55° C. The solution is now substantially an ethereal solution of

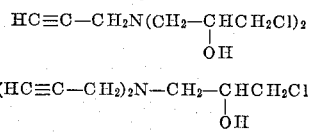

and unreacted tertiary amine

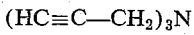

To facilitate closure of the epoxy ring by dehydrohalogenation, the solution was concentrated by removal of the ether solvent by aspiration and, if necessary, slight warming.

The concentrate was cooled to about 10° C. or below in an ice water bath to avoid a rise in temperature while 100 ml. of a 40 percent water solution of sodium hydroxide were added as rapidly as possible. The coolant was removed and the reaction mixture was left to warm to room temperature (about 3 hours), with stirring. A stoichiometric quantity of base was used in this step.

Next, 150 ml. of cold water were added to the reaction product at a rate such that the temperature of the solution remained at 25° C. or below. The upper oily organic layer was removed, and the aqueous layer extracted with ether. The organic fractions were combined and the ether removed by aspiration for two hours at 1.0 mm. pressure and at room temperature. The product (101.2 gm., 85 percent yield) was a cherry-red liquid mixture of

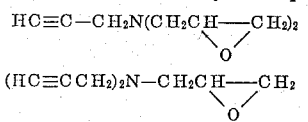

and $$(HC≡C-CH_2)_3N$$

sufficiently pure as not to require further distillation. The mixture had a density of 1.01 gm./cm.³, a $n_D^{25}$ of 1.4821, a heat of combustion of 8.427 kcal./gm., and when oxidized with nitric acid gave a specific impulse of 246–248 sec.

Although specific embodiments have been herein shown and described, it will be understood that they are illustrative, and are not limiting on the scope and spirit of the invention.

What is claimed is:

In the method of making a liquid fuel consisting essentially of a mixture of propargyldiglycidylamine, dipropargylglycidylamine, and tripropargylamine by reacting a mixture of mono-, di-, and tripropargylamines with epichlorohydrin and then dehydrohalogenating chlorohydrins in the reaction mixture by addition of a base, the improvement of reacting said amines with epichlorohydrin by refluxing the epichlorohydrin with an ethereal solution of the amines at about 50 percent concentration until the reaction is completed, then removing the ether solvent and adding substantially stoichiometric quantities of a base while maintaining a temperature of about 10° C.

References Cited by the Examiner

UNITED STATES PATENTS

| 2,766,285 | 10/1956 | Hennion. |
| 2,901,886 | 9/1959 | Doerner. |

FOREIGN PATENTS

| 466,344 | 5/1937 | Great Britain. |
| 675,665 | 7/1950 | Great Britain. |

OTHER REFERENCES

Paquin, A. M.: Epoxydverbindungen and Epoxydharze (1958), pp. 4, 182–188.

JOHN D. RANDOLPH, CARL D. QUARFORTH,
*Examiners.*

N. S. MILESTONE, L. A. SEBASTIAN,
*Assistant Examiners.*